(12) United States Patent
Abrahams

(10) Patent No.: US 6,944,773 B1
(45) Date of Patent: Sep. 13, 2005

(54) METHOD AND APPARATUS FOR FINGERPRINT AUTHENTICATION DURING ON-LINE TRANSACTIONS

(75) Inventor: Marc David Abrahams, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/575,410

(22) Filed: May 19, 2000

(51) Int. Cl.$^7$ .......................... H04L 9/00; G06F 11/30; G06F 15/173; G06F 15/16
(52) U.S. Cl. ...................... 713/201; 713/182; 713/186; 709/229
(58) Field of Search ............................... 713/200, 201, 713/202, 182, 186; 709/223, 224, 225, 226, 709/229

(56) References Cited

U.S. PATENT DOCUMENTS

| | | | | |
|---|---|---|---|---|
| 5,613,012 A | * | 3/1997 | Hoffman et al. ............. | 382/115 |
| 5,801,681 A | | 9/1998 | Sayag ......................... | 345/157 |
| 5,815,252 A | * | 9/1998 | Price-Francis ............... | 356/71 |
| 5,825,005 A | | 10/1998 | Behnke ....................... | 235/380 |
| 5,841,888 A | * | 11/1998 | Setlak et al. ................ | 382/124 |
| 5,933,515 A | * | 8/1999 | Pu et al. ..................... | 382/124 |
| 6,035,403 A | * | 3/2000 | Subbiah et al. ............. | 713/201 |
| 6,072,891 A | * | 6/2000 | Hamid et al. ............... | 382/116 |
| 6,219,793 B1 | * | 4/2001 | Li et al. ..................... | 713/202 |
| 6,259,805 B1 | * | 7/2001 | Freedman et al. .......... | 382/124 |
| 6,270,011 B1 | * | 8/2001 | Gottfried .................... | 235/379 |
| 6,393,139 B1 | * | 5/2002 | Lin et al. .................... | 382/124 |
| 6,446,210 B1 | * | 9/2002 | Borza ......................... | 713/201 |
| 6,757,410 B1 | * | 6/2004 | Nakashima ................. | 382/124 |

* cited by examiner

Primary Examiner—Gilberto Barron, Jr.
Assistant Examiner—Jenise Jackson
(74) Attorney, Agent, or Firm—Thomas F. Lebens; Fitch, Even, Tabin & Flannery (57) ABSTRACT

A method of on-line authentication includes having a user present one or more fingerprints for authentication during an on-line transaction, such as an Internet transaction. The user provides the fingerprints by placing the appropriate finger on the print pad of the fingerprint reader associated with the client computer that the user is using. The method includes receiving through the computer network a communication indicating that authentication is needed, obtaining a first number that indicates how many fingerprints will be requested for authentication, randomly selecting which fingerprints will be requested, sending through the computer network one or more requests for entry of the randomly selected fingerprints, receiving fingerprint data through the computer network in response to the one or more requests for entry of the randomly selected fingerprints, and comparing the received fingerprint data to fingerprint data stored in a database.

24 Claims, 6 Drawing Sheets

| Example Schemes | $N_T$ | Left Hand Fingers | | | | | Right Hand Fingers | | | | |
|---|---|---|---|---|---|---|---|---|---|---|---|
| | | Pinky | Ring | Middle | Index | Thumb | Thumb | Index | Middle | Ring | Pinky |
| A | 5 | | | | | | $F_1$ | $F_2$ | $F_3$ | $F_4$ | $F_5$ |
| B | 5 | $F_2$ | $F_4$ | $F_5$ | $F_1$ | $F_3$ | | | | | |
| C | 8 | $F_7$ | | $F_8$ | $F_2$ | $F_1$ | $F_5$ | $F_4$ | | $F_6$ | $F_3$ |
| D | 3 | | | $F_3$ | | $F_1$ | | | $F_6$ | | |
| E | 10 | $F_4$ | $F_9$ | $F_5$ | $F_{10}$ | $F_1$ | $F_7$ | $F_2$ | $F_6$ | $F_3$ | $F_8$ |
| F | 14 | $F_{12}$ | $F_4, F_{13}$ | $F_8$ | $F_9, F_5$ | $F_3$ | $F_{10}$ | $F_7, F_{14}$ | $F_1$ | $F_{11}$ | $F_2, F_6$ |

METHOD AND APPARATUS FOR FINGERPRINT AUTHENTICATION DURING ON-LINE TRANSACTIONS

BACKGROUND OF THE INVENTION

1. Field of the Invention

The present invention relates generally to authentication during on-line transactions, and more specifically to the use of fingerprints for authenticating on-line transactions.

2. Discussion of the Related Art

Security has long been an important issue in the design of computer systems and communication networks. The recent increase in the popularity of the Internet has created even greater demand for more secure methods of conducting financial and other business transactions over the Internet. The present rate of growth of so-called electronic commerce ("e-commerce") is astounding, and the number of different ways to commit fraud and theft during e-commerce transactions is nearly equally astounding.

One conventional method for authentication during e-commerce transactions is the use of a username and password. This method, however, suffers from the disadvantages that passwords can be forgotten, lost, stolen, and/or easily used by unauthorized people. Passwords are simply not a reliable means of identification.

Thus, there is a need for a reliable and secure method of authentication during on-line transactions which overcomes these and other disadvantages.

SUMMARY OF THE INVENTION

The present invention advantageously addresses the needs above as well as other needs by providing a method of on-line authentication. The method includes the steps of: receiving through a computer network a communication indicating that authentication is needed; obtaining a first number that indicates how many fingerprints will be requested for authentication; randomly selecting which fingerprints will be requested; sending through the computer network one or more requests for entry of the randomly selected fingerprints; receiving fingerprint data through the computer network in response to the one or more requests for entry of the randomly selected fingerprints; and comparing the received fingerprint data to fingerprint data stored in a database.

The present invention also provides a method of setting up on-line authentication. The method includes the steps of: sending through the computer network a request for a total number that indicates how many fingerprints to hold for authentication; receiving through the computer network the requested total number; sending through the computer network one or more requests for entry of fingerprints; receiving fingerprint data through the computer network in response to the one or more requests for entry of fingerprints; assigning a number to each entered fingerprint that is consistent with a number intended by a user who entered the fingerprints; and storing the received fingerprint data and assigned numbers in a database.

The present invention also provides a system for providing on-line authentication. The system includes a database configured to store fingerprint data and user set-up data, a communication device configured to provide a connection to a computer network, and a processor and a memory. The processor and the memory are configured to receive through the computer network a communication indicating that authentication is needed, obtain a first number that indicates how many fingerprints will be requested for authentication, randomly select which fingerprints will be requested, send through the computer network one or more requests for entry of the randomly selected fingerprints, receive fingerprint data through the computer network in response to the one or more requests for entry of the randomly selected fingerprints, and compare the received fingerprint data to fingerprint data stored in the database.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof presented in conjunction with the following drawings herein.

Corresponding reference characters indicate corresponding components throughout several views of the drawing.

DETAILED DESCRIPTION OF A PREFERRED EMBODIMENT

The following description is not to be taken in a limiting sense, but is made for the purpose of describing the general principles of the invention. The scope of the invention should be determined with reference to the claims.

Figure 1:
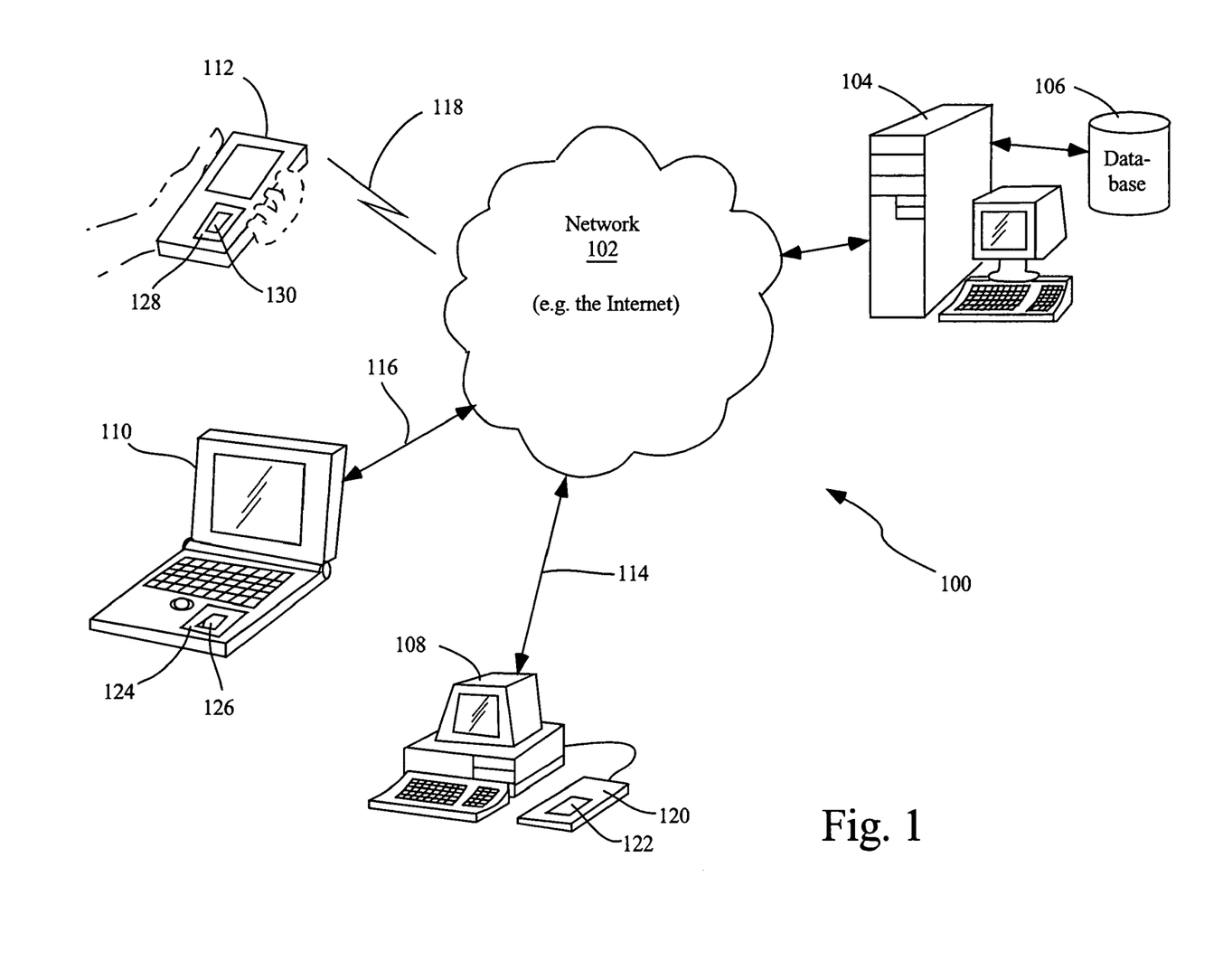
FIG. 1 is a schematic diagram illustrating a system that incorporates a method in accordance with one embodiment of the present invention.

Referring to FIG. 1, there is illustrated a system 100 that incorporates a method of on-line authentication in accordance with an embodiment of the present invention. The method used by the system 100 uses fingerprint technology for authentication during on-line transactions, such as e-commerce transactions. By using fingerprints, the method provides much greater security than does conventional username and password authentication methods.

The system 100 includes a computer network 102, which by way of example, may comprise the popular networks known as the Internet and/or the World Wide Web. A server 104 having a database 106 may be used to host an e-commerce web site in the network 102. The database 106 may be used to maintain the database of fingerprints along with users' membership information. Users may access the web site to perform e-commerce transactions by using any of several types of client computers. By way of example, such client computers may include, but are not limited to, a desktop personal computer (PC) 108, a notebook computer 110, or a hand-held device 112, such as a personal digital assistance (PDA) or a wireless telephone. By way of example, the notebook computer 110 may comprise one of Sony Corporation's popular VAIO™ line of computers.

In the illustrated embodiment, the desktop PC 108 and the notebook computer 110 access the network 102 by means of wired connections 114, 116, respectively, and the hand-held device 112 accesses the network 102 by means of wireless communications 118. It should be well understood, however, that any of the client computers 108, 110, 112 may access the network 102 by means of wired connections or by means of wireless communications.

Client computers that are to be used in accordance with the present invention preferably include, or are connected to, a fingerprint reader. Fingerprint recognition technology is currently available. For example, fingerprint readers and fingerprint recognition software is available from Sony Corporation of Japan. In the illustrated example, the desktop PC 108 is connected to an external fingerprint reader 120 that includes a print pad 122. The notebook computer 110 includes a built-in (or internal) fingerprint reader 124 that includes a print pad 126. The hand-held device 112 also includes a built-in fingerprint reader 128 that includes a print pad 130. It should be understood that different configurations of fingerprint readers, e.g., external, built-in, etc., may be used with any type of client computer in accordance with the present invention. Fingerprint readers may be included on peripheral and other non-PC devices.

In accordance with one embodiment of the present invention, when a user performs an Internet transaction, he or she will normally have to present one or more fingerprints for authentication. The user provides the fingerprints by placing the appropriate finger on the print pad 122, 126 or 130 of the fingerprint reader 120, 124 or 128 associated with the client computer 108, 110 or 112 that the user is using. The transaction server 104 initiates the request for the user to present the fingerprint(s). The user preferably will need to respond with the correct fingerprint within an allotted time or the transaction fails.

After the user enters the requested fingerprints, the fingerprints are sent through the network 102 and are received by the server 104. The server 104 compares the received fingerprints to fingerprints that are stored in the database 106. If all of the fingerprints match, the user is authenticated. If any of the fingerprints do not match, the user is not authenticated.

The user's fingerprints are stored in the database 106 during an initial set-up or configuration process. During this process the user can designate the total number $N_T$ of fingerprints to keep on file. The user can also designate the number $N_A$ of fingerprints that are to be requested for each authentication.

Figure 2:
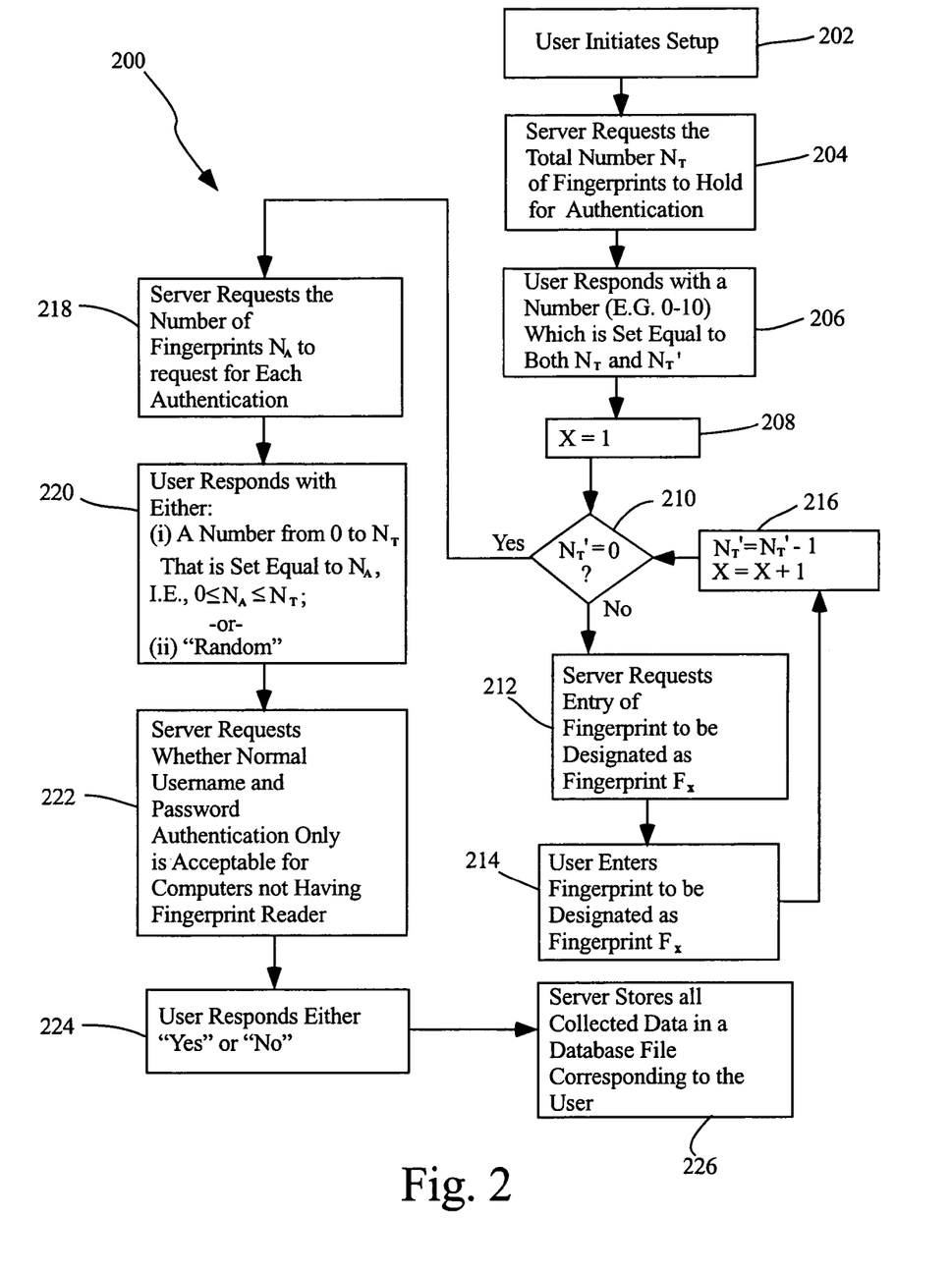
FIG. 2 is a flow diagram illustrating a set-up process in accordance with one embodiment of the present invention.

Referring to FIG. 2, there is illustrated an exemplary set-up process 200 in accordance with an embodiment of the present invention. For the remainder of the discussion herein, it is assumed that the user enters data into a client computer, such as one of the client computers 108, 110 or 112, that communicates with a server, such as the server 104, through a computer network, such as the network 102 (which may comprise the Internet).

In step 202 the user initiates the set-up process. The user may do this by interacting with a web site hosted by the server 104. In step 204, the server 104 requests the total number $N_T$ of fingerprints to hold for authentication. The user responds with a number in step 206. The server 104 sets this number equal to both $N_T$ and $N_T'$. The number $N_T$ will typically be between 0 and 10 to correspond to the user's 10 fingers, but as will be discussed below it could be a greater number.

In step 208, the server 104 enters into a loop to request entry of all of the fingerprints the user wants to have on file. Specifically, a fingerprint counter variable X is set equal to 1 in step 208. In step 210, the server 104 checks whether $N_T'$ is equal to 0. If not, in step 212 the server 104 request entry of the fingerprint that the user wants designated as fingerprint $F_x$. In step 214, the user enters this fingerprint by placing his or her finger on the fingerprint pad of the client computer. In step 216, $N_T'$ is reduced by 1, and X is increased by 1. The loop continues to allow the user to enter all of the fingerprints $N_T$ that he or she designated in step 206. The loop is complete when $N_T'$ is equal to 0.

By way of example, if the user wants to place a total of only five of his or her fingerprints on file in the database 106, he or she can designate $N_T=5$ in step 206. Then in step 214 the user designates which of his or her fingerprints correspond to the fingerprint numbers $F_1$, $F_2$, $F_3$, $F_4$, $F_5$. This allows the transaction server 104 to request any fingerprint randomly from fingerprints $F_1$, $F_2$, $F_3$, $F_4$, $F_5$, which reduces the likelihood of fraud because it is preferred that only the user know which specific fingerprints correspond to fingerprints $F_1$, $F_2$, $F_3$, $F_4$, $F_5$.

Figure 3:
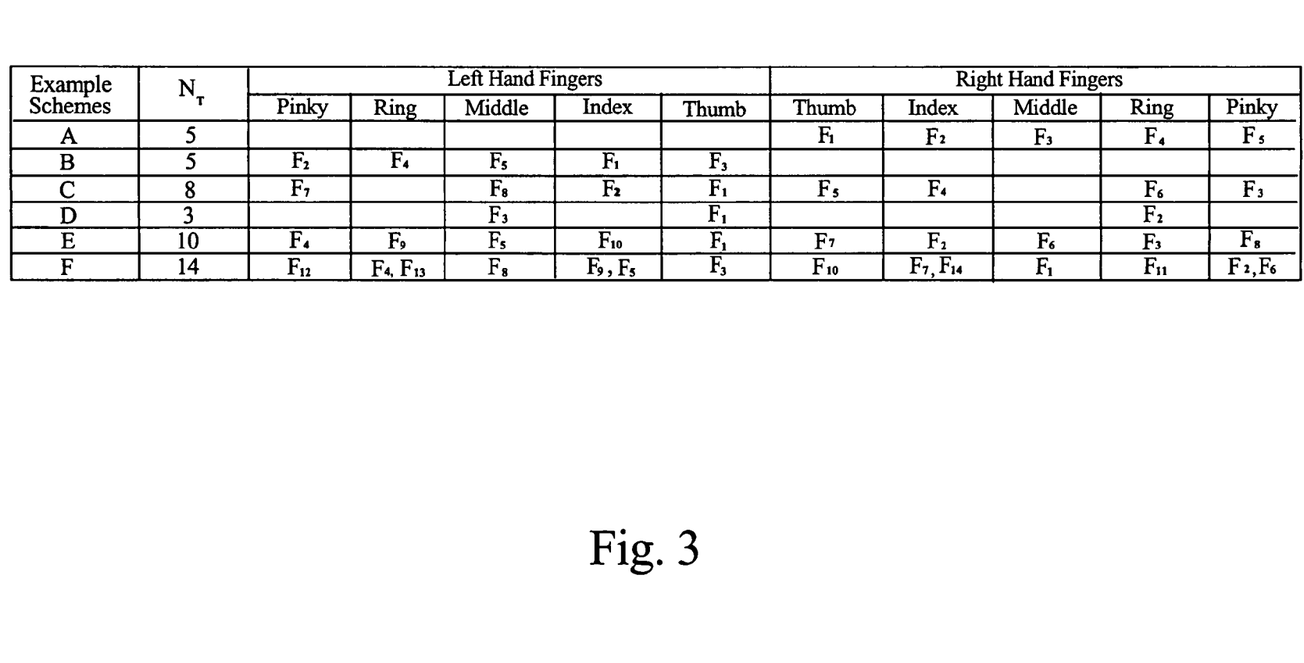
FIG. 3 is a table illustrating several example fingerprint numbering schemes that may be used in the set-up process shown in FIG. 2.

FIG. 3 shows several example schemes which illustrate how a user might designate numbers for his or her fingerprints. It is to be emphasized, however, that these are merely examples and that there are numerous other ways a user can number his or her fingerprints in accordance with the present invention. Furthermore, it is to be understood that the term "fingerprint" as used herein is intended to include thumb prints as well as fingerprints.

In example scheme A the user designates the total number $N_T$ of fingerprints on file to be 5. The user designates only the fingers of the right hand as these 5 fingerprints and numbers them sequentially from the thumb to the pinky. In example scheme B the user also designates the total number $N_T$ of fingerprints on file to be 5. The user designates only the fingers of the left hand as these 5 fingerprints and numbers them in a unique order. In example scheme C the user designates the total number $N_T$ of fingerprints on file to be 8. The user designates fingers of both the right and left hands as these 8 fingerprints and numbers them in a unique order. In example schemes D and E the user designates the total number $N_T$ of fingerprints on file to be 3 and 10, respectively, again designating fingers of both the right and left hands and numbering them in a unique order.

While a user will normally designate the total number $N_T$ of fingerprints to be between 0 and 10, example scheme F illustrates that it is possible to designate the total number $N_T$ of fingerprints to be more than 10. Specifically, in example scheme F the user designates the total number $N_T$ of fingerprints on file to be 14. The user designates fingers of both the right and left hands as these 14 fingerprints, with 4 of the fingerprints being used twice. Thus, during authentication if the server 104 requests entry of fingerprints $F_4$ and $F_{13}$, the user should respond in both cases with the left hand ring finger, and if the server 104 requests entry of fingerprints $F_2$ and $F_6$, the user should respond in both cases with the right hand pinky finger. Such a scheme may further reduce the opportunity for fraud.

In step 218, the server 104 requests the number of fingerprints $N_A$ that the user wants to have requested for each authentication. The user responds to this request in step 220. The user can either designate that the number $N_A$ be equal to a number from 0 to $N_T$, or the user can designate that the number $N_A$ be a random number generated by the server 104.

In step 222 the server 104 requests whether normal username and password authentication is acceptable for client computers that do not have a fingerprint reader. The user responds in step 224 by entering either "yes" or "no". This option provides the user the ability to authenticate themselves from computers that do not have a fingerprint reader.

Finally, the set-up process 200 concludes in step 226 with the server 104 storing all of the collected data in the database 106 in a file for the user.

Figure 4:
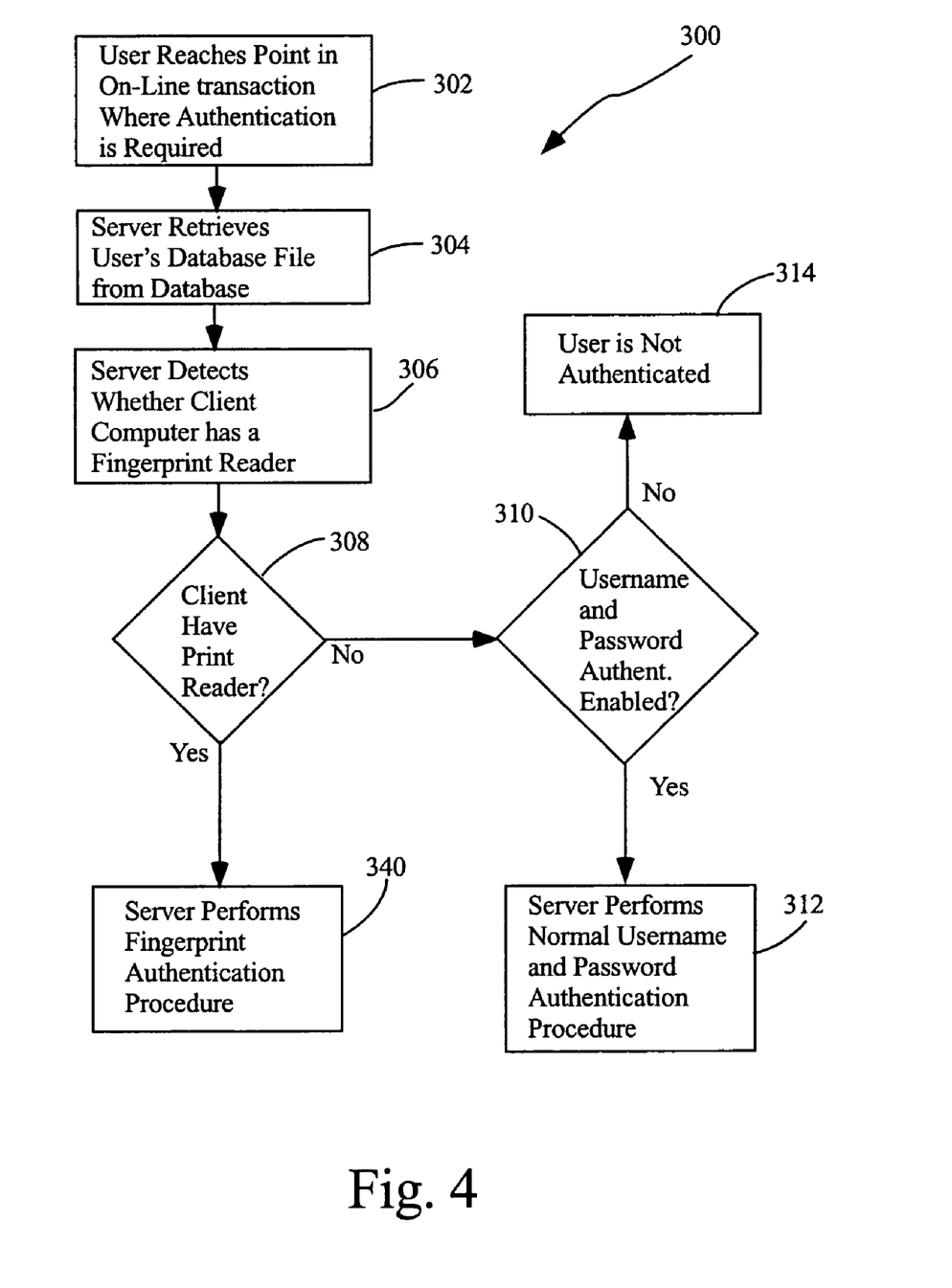
FIG. 4 is a flow diagram illustrating an authentication process in accordance with one embodiment of the present invention.

Once the set-up process 200 has been completed, the user is ready to perform an on-line transaction using his or her fingerprints for authentication. Referring to FIG. 4, there is illustrated an exemplary authentication process 300 in accordance with an embodiment of the present invention. Specifically, in step 302 the user reaches a point in an on-line transaction where authentication is required. In step 304 the server 104 retrieves the user's file from the database 106.

The server 104 detects whether or not the client computer has a fingerprint reader in steps 306 and 308. If the client computer does have a fingerprint reader, the server 104 performs the fingerprint authentication procedure 340. However, if the client computer does not have a fingerprint reader, then in step 310 the server 104 checks whether normal username and password authentication was enabled during the set-up process 200 (see step 222). If normal username and password authentication is enabled, then the server 104 performs a normal username and password authentication procedure 312. If, on the other hand, normal username and password authentication is not enabled, then the user can not be authenticated as indicated in step 314.

Figure 5:
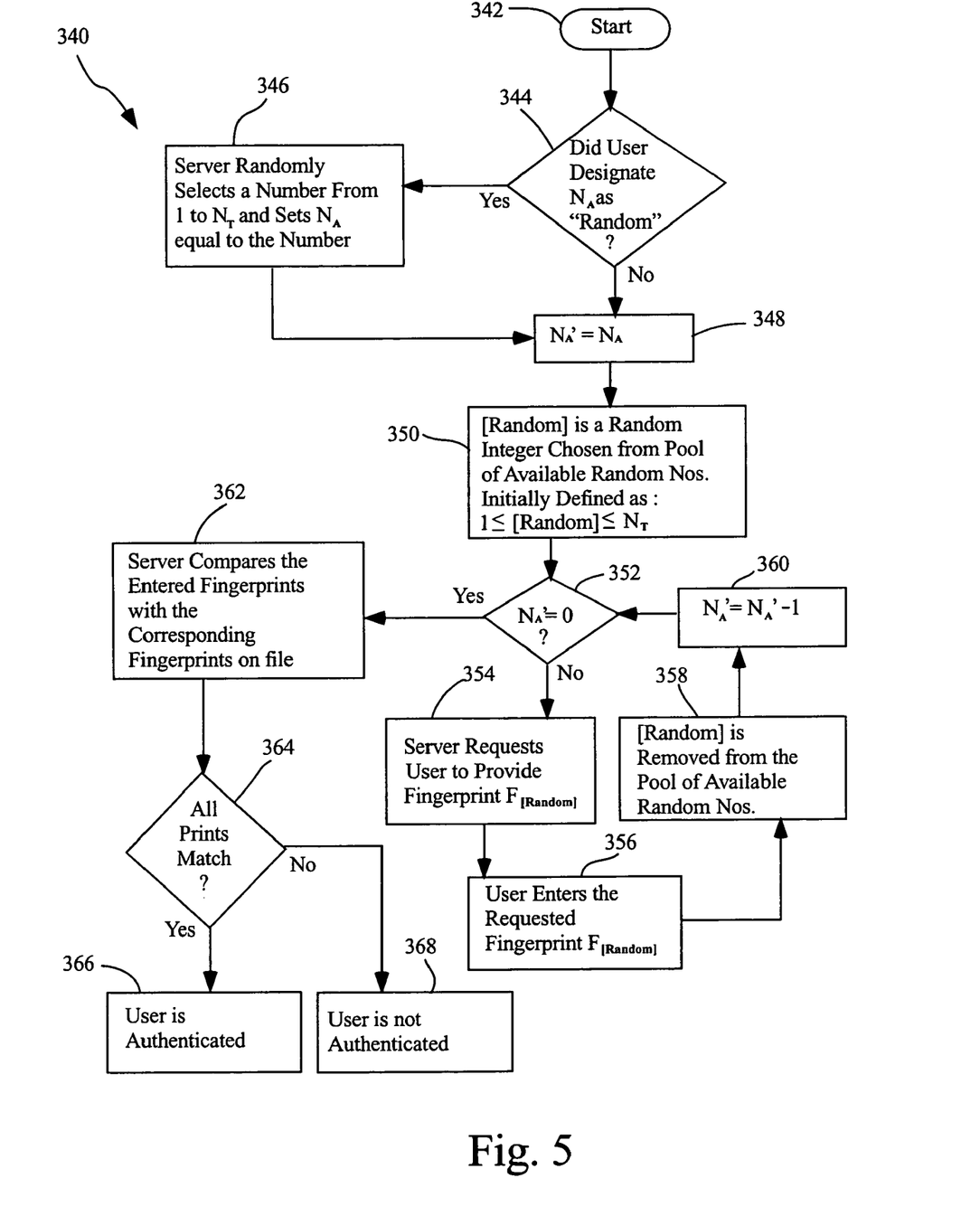
FIG. 5 is a flow diagram illustrating a fingerprint authentication process in accordance with one embodiment of the present invention.

FIG. 5 illustrates an exemplary version of the fingerprint authentication procedure 340 in accordance with an embodiment of the present invention. The procedure begins in step 342. In step 344 the server 104 determines whether or not the user designated the number $N_A$ as "random" during the set-up process 200 (see step 220). If the user did designate $N_A$ as random, then the server 104 randomly selects a number from 1 to $N_T$ and sets $N_A$ equal to that number in step 346. A user can designate $N_A$ as "random" if the user wants the server 104 to request a random number of fingerprints during authentication.

If the user wants the server 104 to request a fixed number of fingerprints during each authentication (e.g., 3 fingerprints), then the user designates that number for $N_A$ in step 220 of the set-up process 200.

In step 348 the number $N_A'$ is set equal to $N_A$. In step 350 a pool of available random numbers is initially defined as being greater than or equal to 1 and less than or equal to the total number $N_T$. The term "[RANDOM]" as used herein indicates that the server 104 will generate a random integer from the pool of available random numbers. This function is used by the server 104 to randomly select which fingerprint will be requested from the user. Fingerprints are randomly selected from the total number $N_T$ of fingerprints on file for a particular user.

Beginning with step 352, the server 104 enters a loop wherein it requests the user to provide a number of fingerprints equal to $N_A$. The server 104 requests these fingerprints in a random order by using [RANDOM]. Specifically, in step 354 the server 104 requests the user to provide fingerprint $F_{[RADOM]}$. Again, [RANDOM] is a random number drawn from the pool of random numbers initially set in step 350. The user enters the requested fingerprint in step 356. The user enters the fingerprint that he or she designated as $F_{[RANDOM]}$ during the set-up process 200. For example, if [RANDOM]=3, then the user enters the fingerprint that he or she designated as $F_3$ during set-up; if [RANDOM]=7, then the user enters the fingerprint that he or she designated as $F_7$ during set-up; etc. Preferably, only the user will know which specific fingerprint corresponds to the number of the fingerprint requested by the server 104.

As an optional feature of the present invention, a time-out loop may be inserted between steps 354 and 356. Such a time-out loop would require that the user enter the requested fingerprint within a predetermined amount of time. If the time-out loop expires before the user enters the requested fingerprint in step 356, the user would not be authenticated. The time-out loop may further require that users who are once rejected by the time-out loop have only a certain number of opportunities to retry authentication or must wait a certain amount of time to retry authentication.

In step 358 the current random number [RANDOM] may be removed from the pool of available random numbers. This way the same two fingerprints will not be requested during one authentication process. It should be well understood, however, that step 358 is optional. This step is optional because it may be deemed desirable in many scenarios to retain the possibility of having the same fingerprints requested during one authentication.

The number $N_A'$ is reduced by 1 in step 360. The loop continues until $N_A'$ is equal to 0. This allows the user to enter all of the requested fingerprints, and the number of entered fingerprints will be equal to $N_A$.

At the end of the loop, the server 104 compares all of the entered fingerprints with the corresponding fingerprints on file for the user. The server 104 performs this comparison in steps 362 and 364. If all of the fingerprints match, the user is authenticated in step 366. If any of the fingerprints do not match, the user is not authenticated in step 368.

Figure 6:
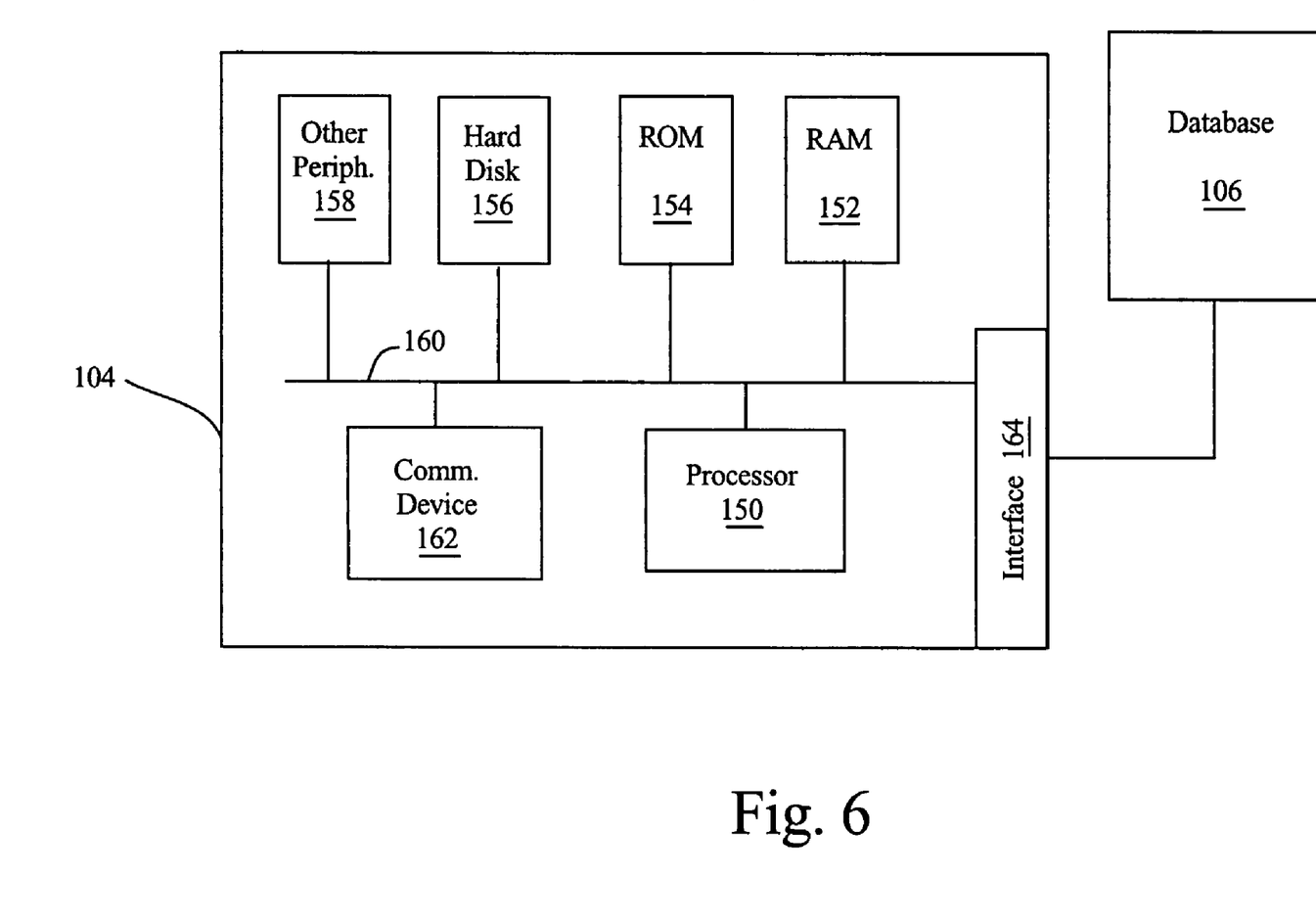
FIG. 6 is a block diagram illustrating an exemplary architecture for the server shown in FIG. 1.

Referring to FIG. 6, there is illustrated an exemplary architecture for the server 104. The server 104 may include a processor 150, a random access memory (RAM) 152, a read only memory (ROM) 154, hard disk storage 156, other peripherals 158, and an interface 164, all interconnected by a main bus 160. Furthermore, a communication device 162 is preferably included that is configured to provide a connection to a computer network, such as the network 102. The communication device 162 may comprise a modem or other means for connecting to a network. The processor 150 may comprise a microprocessor or the like. The processor 150 and the appropriate memories are preferably configured to perform the methods described herein. Such configuring is typically done by means of software. Furthermore, it should be understood that the various databases described herein for storing fingerprint data and user set-up data may be stored in the database 106, or the hard disk storage 156, or some other storage device.

The fingerprint authentication method of the present invention can be applied to digital information downloads, e-commerce, banking and financial transactions, memo authentication and many other areas. The invention may be used for identification purposes and to capture a fingerprint signature for the purpose of conducting secure financial or other business transactions over the Internet.

One example use of the present invention is with a Sony Corporation digital storage house. Specifically, member customers of this service have the ability to store and retrieve digital images from the digital storage house. By using fingerprints for authentication, customers of the digital image storage house can access their images from computers, kiosks and other non-PC devices that have a fingerprint reader. Furthermore, when a customer becomes a member of such an on-line service and product transaction house, the customer can choose to enable typical username and password authentication so that the customer has the ability to authenticate themselves from computers or keyboard equipped devices that do not have a fingerprint reader.

While the invention herein disclosed has been described by the specific embodiments and applications thereof, numerous modifications and variations could be made thereto by those skilled in the art without departing from the scope of the invention set forth in the claims.

What is claimed is:

1. A method of on-line authentication, comprising the steps of:

receiving through a computer network a communication indicating that authentication is needed;

obtaining a first number that indicates how many fingerprints will be requested for authentication;

randomly selecting which fingerprints will be requested by using a fingerprint numbering scheme designated by a user whose fingerprints will be requested, wherein the fingerprint numbering scheme includes fingerprint designators that are assigned by the user;

sending through the computer network one or more requests for entry of the randomly selected fingerprints;

receiving fingerprint data through the computer network in response to the one or more requests for entry of the randomly selected fingerprints; and comparing the received fingerprint data to fingerprint data stored in a database.

2. A method in accordance with claim 1, wherein the step of obtaining a first number comprises the step of:

randomly selecting the first number.

3. A method in accordance with claim 1, wherein the step of obtaining a first number comprises the step of:

retrieving the first number from the database.

4. A method in accordance with claim 1, wherein the first number is equal to or less than a total number of fingerprints stored in the database for a particular user.

5. A method in accordance with claim 1, wherein the step of randomly selecting which fingerprints will be requested comprises the step of:

randomly selecting fingerprints from a total number of fingerprints stored in the database for a particular user.

6. A method in accordance with claim 1, further comprising the step of:

detecting through the computer network whether a client computer has a fingerprint reader.

7. A method in accordance with claim 1, further comprising the steps of:

receiving set-up data for a particular user through the computer network; and storing the received set-up data in the database.

8. A method of setting up on-line authentication, comprising the steps of:

sending through the computer network a request for a total number that indicates how many fingerprints to hold for authentication;

receiving through the computer network the requested total number;

sending through the computer network one or more requests for entry of fingerprints;

receiving fingerprint data through the computer network in response to the one or more requests for entry of fingerprints;

assigning a number to each entered fingerprint that is consistent with a number intended by a user who entered the fingerprints such that fingerprint designators are assigned by the user; and storing the received fingerprint data and assigned numbers in a database.

9. A method in accordance with claim 8, further comprising the step of:

sending through the computer network a request for a first number that indicates how many fingerprints will be requested for each authentication.

10. A method in accordance with claim 8, further comprising the step of:

receiving through the computer network a first number that indicates how many fingerprints are to be requested for each authentication, wherein the first number is greater than or equal to zero and less than or equal to the total number.

11. A method in accordance with claim 8, further comprising the step of:

receiving through the computer network an indication that a number is to be randomly selected to indicate how many fingerprints will be requested for each authentication.

12. A method in accordance with claim 8, further comprising the step of:

sending through the computer network a request for whether username and password authentication should be enabled for client computers not having a fingerprint reader.

13. A method in accordance with claim 8, further comprising the step of:

receiving through the computer network an indication that username and password authentication should be enabled for client computers not having a fingerprint reader.

14. A system for providing on-line authentication, comprising:

a database configured to store fingerprint data and user set-up data;

a communication device configured to provide a connection to a computer network; and a processor and a memory configured to receive through the computer network a communication indicating that authentication is needed, obtain a first number that indicates how many fingerprints will be requested for authentication, randomly select which fingerprints will be requested by using a fingerprint numbering scheme designated by a user whose fingerprints will be requested, send through the computer network one or more requests for entry of the randomly selected fingerprints, receive fingerprint data through the computer network in response to the one or more requests for entry of the randomly selected fingerprints, and compare the received fingerprint data to fingerprint data stored in the database;

wherein the fingerprint numbering scheme includes fingerprint designators that are assigned by the user.

15. A system in accordance with claim 14, wherein the processor and the memory are further configured to obtain the first number by randomly selecting the first number.

16. A system in accordance with claim 14, wherein the processor and the memory are further configured to obtain the first number by retrieving the first number from the database.

17. A system in accordance with claim 14, wherein the first number is equal to or less than a total number of fingerprints stored in the database for a particular user.

18. A system in accordance with claim 14, wherein the processor and the memory are further configured to receive set-up data for a particular user through the computer network and store the set-up data in the database.

19. A system in accordance with claim 14, wherein the processor and the memory are further configured to send through the computer network a request for a total number that indicates how many fingerprints to hold for authentication.

20. A system in accordance with claim 14, wherein the processor and the memory are further configured to receive fingerprint data through the computer network in response to one or more requests for entry of fingerprints.

21. A system in accordance with claim 20, wherein the processor and the memory are further configured to assign a number to each entered fingerprint that is consistent with the fingerprint numbering scheme designated by the user who entered the fingerprints, and store the received fingerprint data and assigned numbers in the database.

22. A method in accordance with claim 1, wherein the fingerprint data stored in the database comprises more than ten fingerprints stored for the user.

23. A method in accordance with claim 8, wherein the requested total number is greater than ten.

24. A system in accordance with claim 14, wherein the fingerprint data stored in the database comprises more than ten fingerprints stored for the user.

* * * * *